United States Patent [19]

Moser et al.

[11] Patent Number: 4,470,656
[45] Date of Patent: Sep. 11, 1984

[54] CONNECTOR ASSEMBLY FOR UNDERCARPET COMMUNICATION CABLE AND POWER CABLE

[75] Inventors: Jessie L. Moser, Highpoint; Ned A. Sigmon, Clemmons, both of N.C.

[73] Assignee: AMP Incorporated, Harrisburg, Pa.

[21] Appl. No.: 389,821

[22] Filed: Jun. 18, 1982

[51] Int. Cl.³ .......................................... H01R 13/512
[52] U.S. Cl. ............................ 339/122 F; 339/122 R; 339/125 R; 339/176 MF
[58] Field of Search ........ 339/176 MF, 122 F, 122 R, 339/176 M, 36, 17 F, 123, 197 R

[56] References Cited

U.S. PATENT DOCUMENTS

| 4,240,688 | 12/1980 | Sotolongo | 339/125 R X |
| 4,289,370 | 9/1981 | Storck | 339/176 MF X |
| 4,332,433 | 6/1982 | Balde et al. | 339/125 R |
| 4,387,949 | 6/1983 | Maitmanek | 339/125 R |

FOREIGN PATENT DOCUMENTS 2098545  3/1972  France ........................... 339/176 M Primary Examiner—Z. R. Bilinsky
Attorney, Agent, or Firm—Gerald K. Kita; F. Brice Faller

[57] ABSTRACT

An electrical connector assembly provides electrical outlets for undercarpet power cable and for communication cable, and a divider plate of the assembly divides the assembly into separate compartments that separate electrical connections of outlets to the power cable from electrical connections of outlets to the communication cable.

3 Claims, 6 Drawing Figures

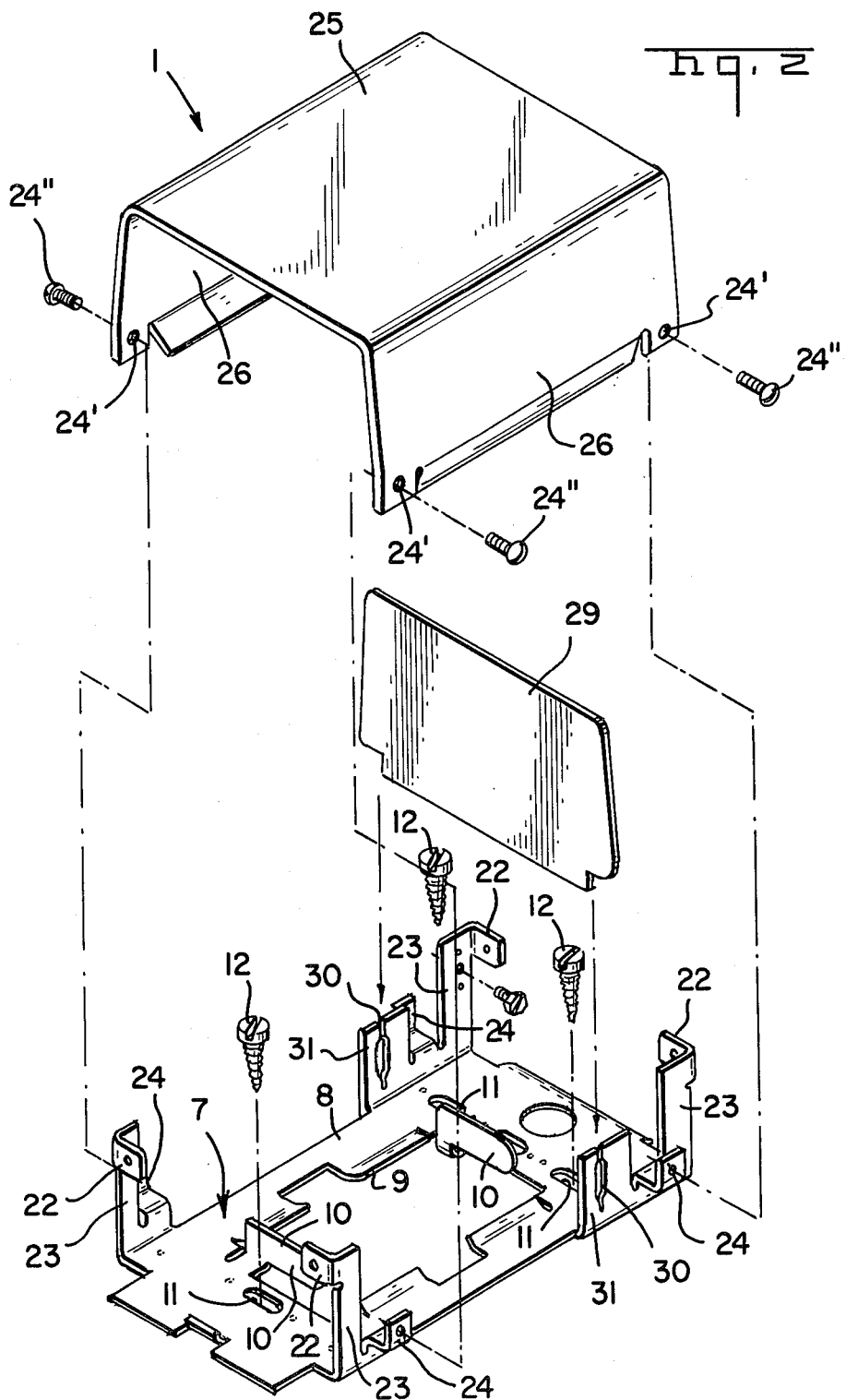

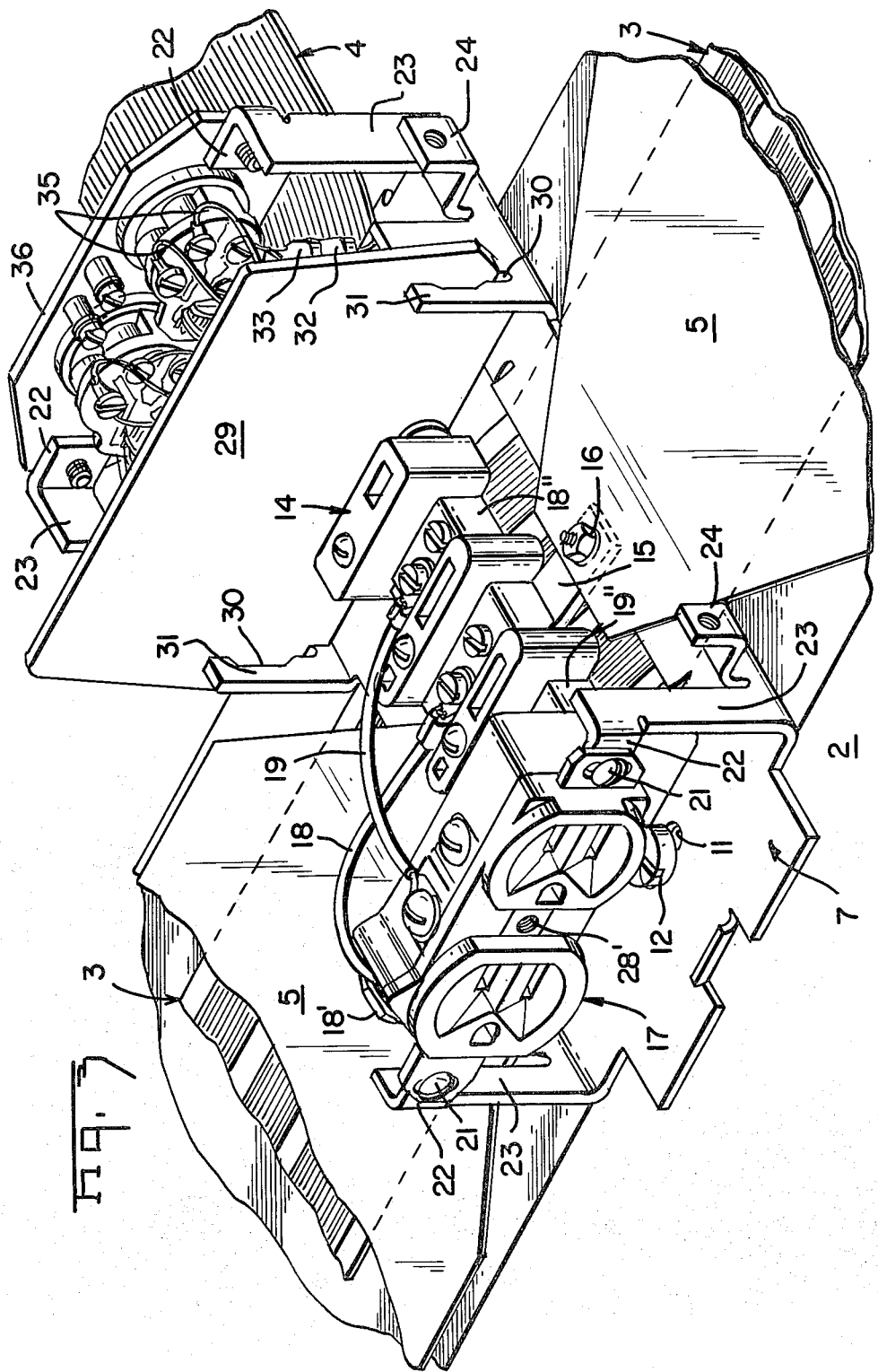

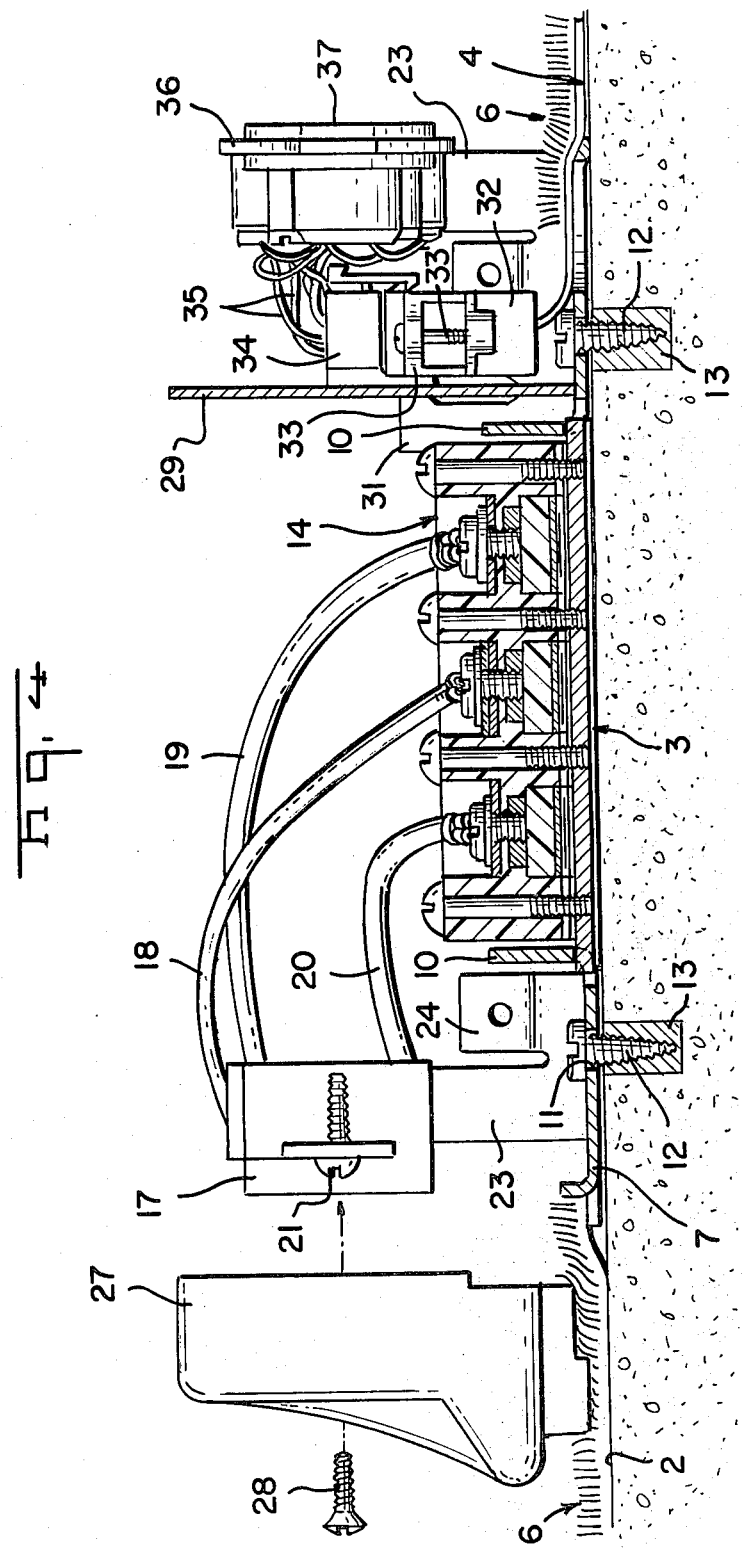

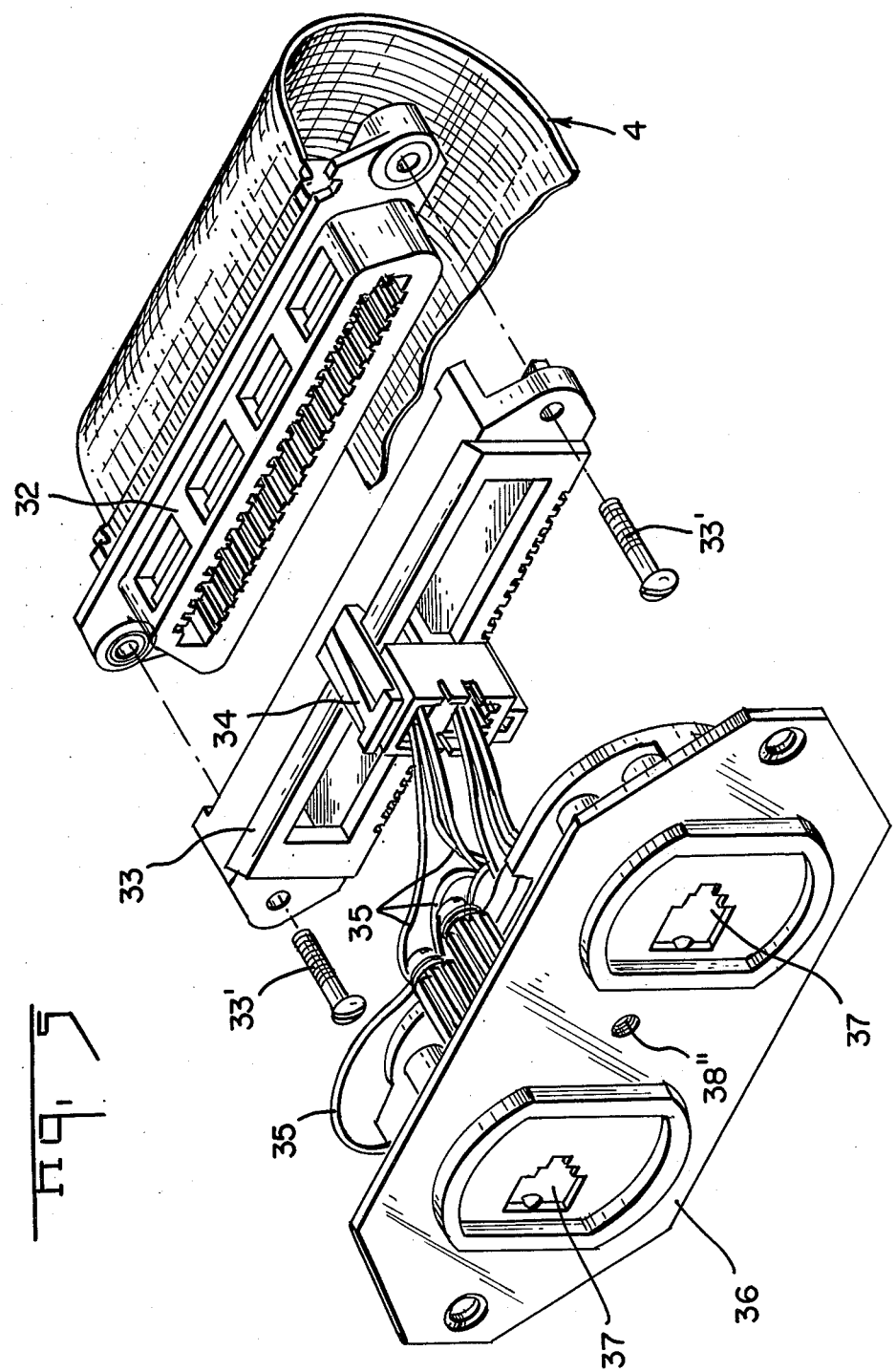

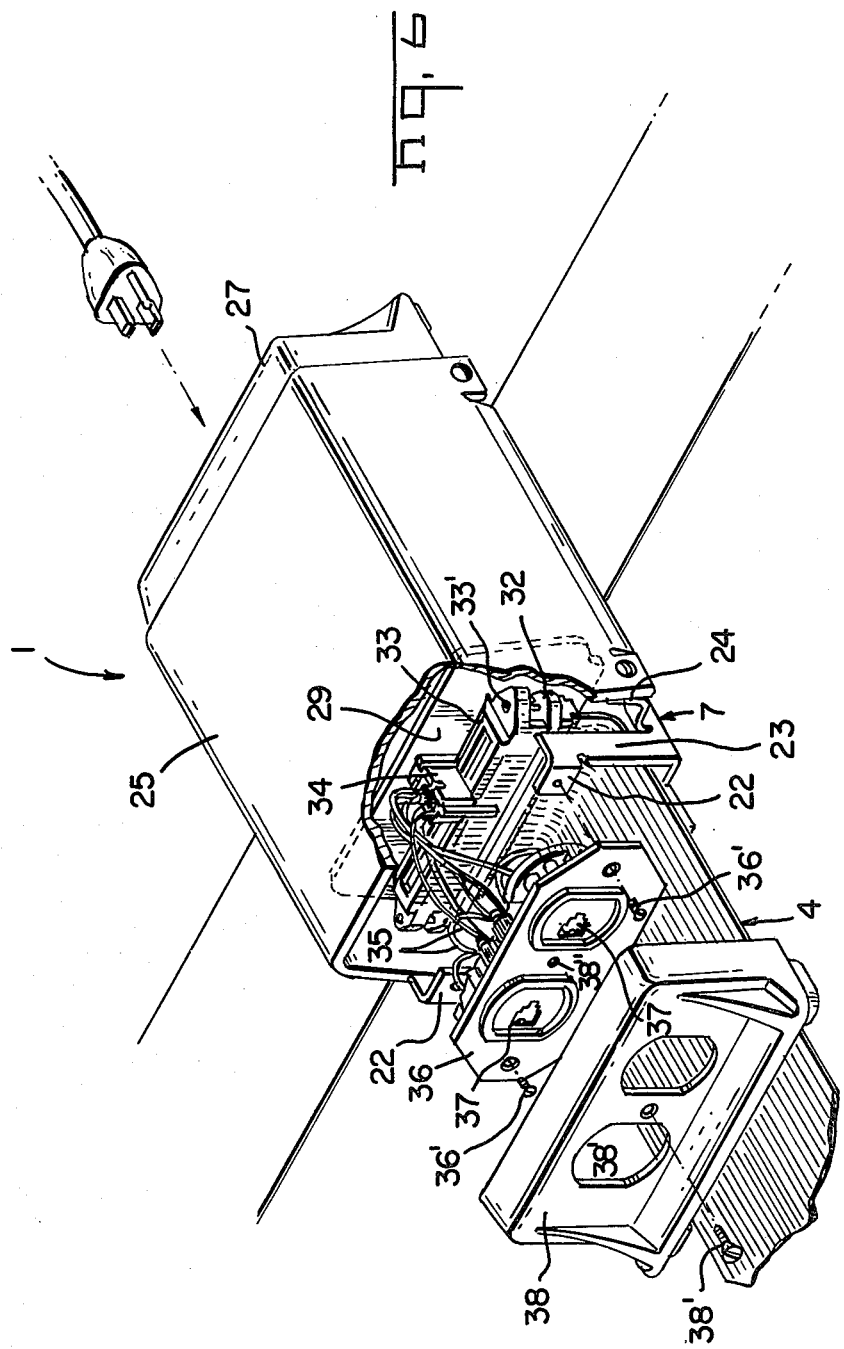

CONNECTOR ASSEMBLY FOR UNDERCARPET COMMUNICATION CABLE AND POWER CABLE

There is disclosed in U.S. Pat. No. 4,240,688, a floor fixture for flat undercarpet cable. A terminal block carries electrical terminals that penetrate conductors of the cable. The fixture requires a duplex receptacle, i.e., electrical receptacle connector with two receptacles for respective receipt of an electrical plug of the type provided on the electrical cord of a household appliance or office machine. Insulated wires are installed to connect the terminals of the terminal block with the duplex receptacle. A housing is assembled over the terminal block and duplex receptacle.

The present invention resides in an electrical connector assembly comprising a base plate, a hollow cover cooperating with the base plate to define a connector cavity, a divider plate removably secured to the base plate and cooperating with the cover to divide the connector cavity into separate and distinct compartments, the cover having openings communicating with respective compartments of the connector cavity, outlet jacks mounted in respective openings, bezel plates secured removably to the outlet jacks and covering the respective openings in the cover. Electrical connections of the outlet jacks and respective electrical power conductors are contained in one of the compartments. The divider plate separates these electrical connections from the remainder of the connector cavity. The divider plate thereby protects a workman during installation of outlet jacks to communication cable in another compartment. The invention permits both electrical power and communication outlets in a single connector assembly. An object of the invention is to provide a single electrical connector assembly that provides electrical outlets for continuous, uncut flat power supplying cable and for communication cable, and for isolating the electrical connections to the respective cables in separate compartments.

A better understanding of the invention is obtained by way of example by the following detailed description and accompanying drawings in which:

FIG. 2 is an enlarged perspective view with parts exploded of a base plate, divider plate, and cover according to the invention.

FIG. 3 is an enlarged fragmentary perspective of the electrical connections between outlet receptacles and the respective power and communication cables.

FIG. 4 is an elevation view in section of the apparatus shown in FIG. 3.

FIG. 5 is a perspective view of component parts of the outlet receptacles and the connections thereof with the communication cable.

FIG. 6 is a perspective view with parts exploded of the bezel plate for the communication outlet receptacles.

Figure 1:
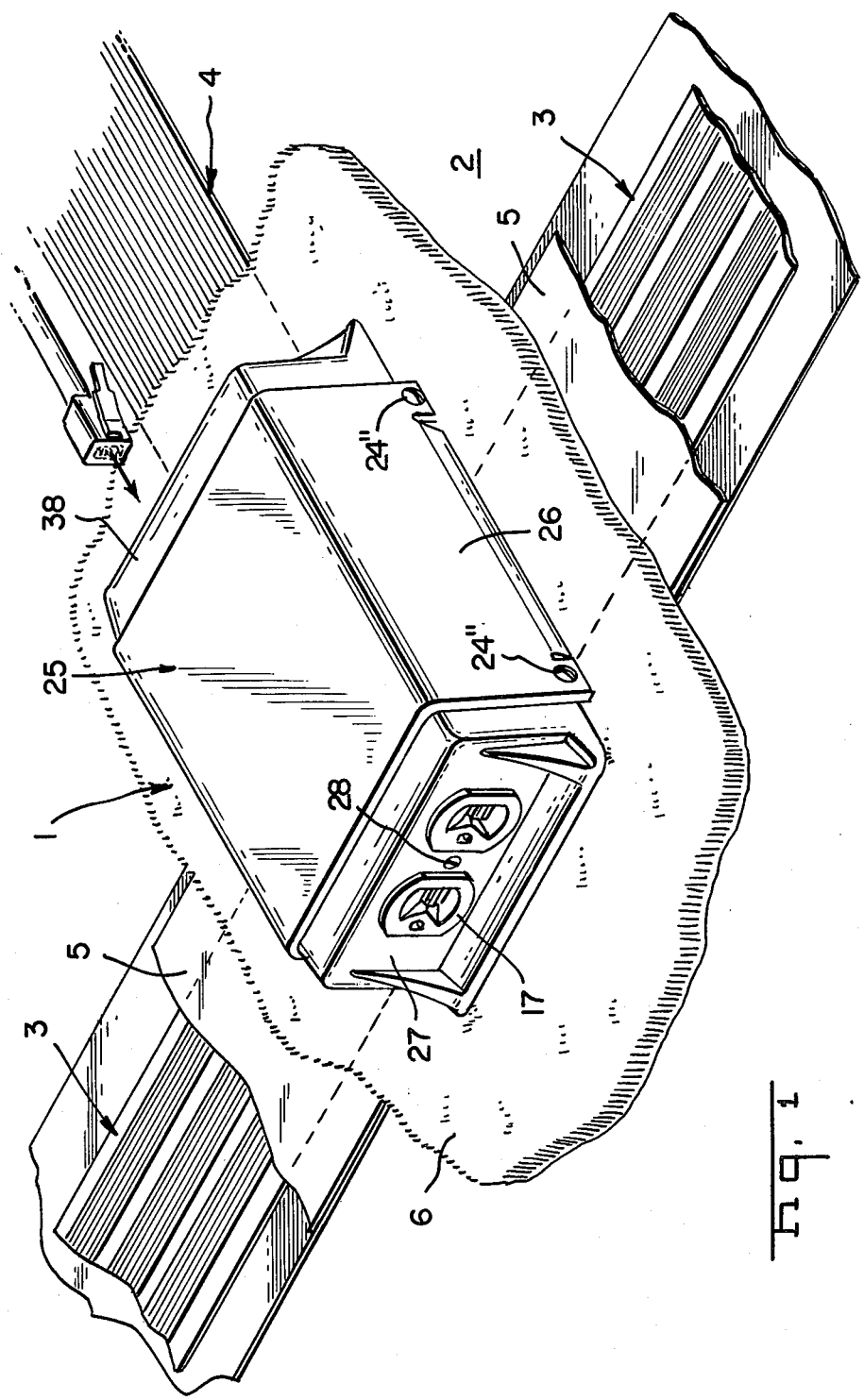
FIG. 1 is a fragmentary perspective view of an electrical connector assembly according to the present invention installed to a flat undercarpet power cable and a flat communication cable.

FIG. 1 illustrates an electrical connector assembly 1 for mounting on a floor 2 of an office or other commercial space in a building. Flat electrical power cable 3 and a flat electrical communication cable 4 are routed across the floor 2. The assembly 1 is electrically connected to the conductors of the cables 3 and 4 and provides electrical outlets for those cables. A metal shield 5 overlies the power cable 3 to protect the cable from furniture and floor traffic. Carpeting 6 overlies the floor 2 and covers the cables 3 and 4 and the shield 5. FIGS. 2 and 3 illustrate details of the assembly 1. A base plate 7 is stamped and formed from a metal blank and includes a bottom wall 8 having a central opening 9, and side walls 10 on opposite ends of the opening 9 which are bent to project outwardly of the plane of the bottom wall 8. The bottom wall 8 includes mounting apertures 11 adjacent the walls 10. FIGS. 3 and 4 show that the bottom wall 8 overlies the cable 3 with the cable 3 being continuous, uncut and exposed in the central opening 9. The apertures 11 are along opposite sides of the cable 3 and receive threaded apertures 12 that secure in sleeve anchors 13 imbedded in the floor 2. A terminal block 14 registers with the opening 9 between the side walls 10 and is electrically connected to the respective conductors of the cable 3. Details of the terminal block 14 and the electrical connections thereof to the cable 3 are disclosed in U.S. Pat. No. 4,240,687. FIG. 3 illustrates an electrical terminal 15 of the terminal block 14 at electrically ground potential secured by a bolt type fastener 16 to the metal shield 5.

Further details of the invention are disclosed by way of example in FIGS. 2, 3, and 4. A standard duplex receptacle 17 provides a pair of outlet jacks for the power cable 3. Details of the duplex receptacle 17 are disclosed in U.S. Pat. No. 4,240,688. Electrical wires 18, 19, and 20 connect the respective electrical terminals 18', 19', and 20' of the duplex receptacle 17 with respective terminals 15, 18'', and 19'' of the terminal block 14. The duplex receptacle 17 is mounted by threaded fasteners 21 that threadably secure to mounting flanges 22 which are integral with and project from corner posts 23 that, in turn, are integral with and bent to project outwardly of the plane of the bottom wall 8. Each corner post 23 is provided with an integral mounting tab 24. A cover 25 is stamped and formed from a metal blank into an inverted channel shape with open ends. The cover overlies the base plate 7 to enclose the terminal block 14 and the duplex receptacle 17 and the wires 18, 19, and 20. Side walls 26 of the cover 25 have apertures 24' that receive threaded fasteners 24'' that secure in respective tabs 24, so that the cover is secured to the base plate 7.

The duplex receptacle 17 is exposed at one open end of the cover. A bezel plate 27 is removably mounted by threaded fastener 28 to a threaded recess 28' in the duplex receptacle 17. The bezel plate 27 fills the open end of the cover 25, covers the respective corner posts 23 and exposes and surrounds the outlet jacks of the duplex receptacle 17. Each of the exposed jacks is then available for pluggable connection of an electrical plug of the type provided on the electrical cord of a household appliance or office machine. Power that is conveyed by the conductors of the cable 3 then may be supplied to the appliance or machine.

The cover 25 and base plate 7 cooperate to define a connector cavity. A planar divider plate 29 is shown in FIGS. 2, 3, and 4. The divider plate 29 spans across the bottom wall 8 and has edges that are mounted removably in aligned slots 30 of respective slotted tabs 31 which are integral with and are bent to project outwardly from opposite sides of the bottom wall 8 of the base plate 7. The divider plate 29 spans across the bottom plate 7 and divides the connector cavity into separate compartments. The divider plate thus cooperates with the base plate 7 and the cover 25 to define a compartment that isolates the duplex receptacle 17, the power cable 3 and the electrical connections therebetween.

FIGS. 5 and 6 illustrate a receptacle electrical connector 32, such as that disclosed in U.S. Pat. No. 3,760,335. The connector 32 is electrically connected to the respective conductors of the communication cable 4 in a manner disclosed in U.S. Pat. No. 4,278,314. Alternatively, the connector 32 may be connected to the conductors of the cable 4 in a manner disclosed in U.S. Pat. No. 4,147,399. A face plate 33 is connected by threaded fasteners 33' to the connector 32. A plug 34 in the form of a line assignment module is electrically connected by conductors 35 to a duplex jack 36. Each outlet jack 37 of the duplex jack 36 is of standard design approved for use in the U.S.A. National Telephone Network and is disclosed in U.S. Pat. No. 3,850,497. Each outlet jack 37, the conductors 35, the line assignment module 34, and the face plate 33, are disclosed in U.S. Pat. No. 4,335,929.

FIG. 6 illustrates that the component parts 32, 34, 35, 36, and 37 may be assembled within a compartment defined by cooperation of the base plate 7, the cover 25, and the divider plate 29. The duplex jack 36 is assembled with threaded fasteners 36' that threadably secure to the respective mounting flanges 22 of the corner posts 23. A bezel plate 38 is secured by threaded fastener 38' that secures in a threaded aperture 38" in the duplex jack 36. The bezel plate 38 covers the open end of the compartment and the respective corner posts 23, and surrounds and exposes the outlet jacks 37.

Although a preferred embodiment of the present invention has been described and shown, other embodiments and modifications that are apparent to one having ordinary skill in the art, are intended to be covered by the spirit and scope of the claims.

We claim:

1. A floor fixture type of electrical connector assembly which provides independent electrical connections for a flat undercarpet power cable and a flat undercarpet communications cable which approach the fixture from substantially orthogonal directions comprising:

a base plate having an opening therein profiled to provide access to the individual conductors of a flat power cable when said plate is situated thereon;

a divider plate upstanding from said base plate, removably secured thereto, and situated to flank said power cable on one side and face the direction of communication cable approach on the other side;

a cover secured to the base plate, said cover defining a compartment on each side of the divider and an opening to each compartment;

a power outlet jack mounted to the base plate in the compartment on said one side of said divider and means in said compartment for connecting said jack to said power cable;

a communications outlet jack mounted to the base plate in the compartment on said other side of said divider and means in said compartment for connecting said jack to said communications cable;

bezel means surrounding the communications outlet jack and covering the respective opening, said bezel means being removable from the assembly without removing the cover from the base, whereby, the power outlet jack may be connected to a continuous uncut flat power cable and the communications cable connection may be serviced without exposing the power connection.

2. The electrical connector assembly according to claim 1, wherein flanges project from opposite sides of the base plate, the divider plate spans between the flanges and across the base plate, and slotted openings in the flanges receive edges of the divider plate.

3. The electrical connector assembly according to claim 1, wherein, the base plate is formed with projecting corner posts, and mounting flanges on said corner posts mount respective outlet jacks.

* * * * *